United States Patent [19]

Sieger et al.

[11] 3,758,686
[45] Sept. 11, 1973

[54] METHOD OF USING STEROID ACETONIDES

[75] Inventors: George Madison Sieger, Montvale, N.J.; Walter Shultz, Spring Valley, N.Y.; Charles Krieger, Clifton, N.J.

[73] Assignee: American Cyanamid Company, Stamford, Conn.

[22] Filed: Dec. 7, 1971

[21] Appl. No.: 205,762

[52] U.S. Cl. .......................... 424/241, 260/239.55 D
[51] Int. Cl. ............................................. A61k 17/00
[58] Field of Search .................................. 424/241; 260/239.55 D

[56] References Cited
UNITED STATES PATENTS

| | | | |
|---|---|---|---|
| 3,073,743 | 1/1963 | Spero | 260/239.55 D |
| 3,048,581 | 8/1962 | Fried | 260/239.55 D |
| 2,838,499 | 6/1958 | Spero et al. | 260/239.55 D |
| 3,312,590 | 4/1967 | Elks et al. | 424/243 |
| 3,312,591 | 4/1967 | Elks et al. | 424/241 |
| 3,147,249 | 9/1964 | Ercoli et al. | 260/239.55 D |
| 3,152,154 | 10/1964 | Ercoli et al. | 260/397.45 |
| 3,691,214 | 9/1972 | Ercoli et al. | 260/397.45 |
| 3,694,471 | 9/1972 | Ercoli et al. | 260/397.45 |
| 3,422,193 | 1/1969 | Shapiro et al. | 424/243 |
| 3,383,394 | 5/1968 | Weber et al. | 260/397.45 |

*Primary Examiner*—Shep K. Rose
*Attorney*—Ernest Y. Miller et al.

[57] ABSTRACT

A method of treating topical inflammation in mammals by the administration of triamcinolone acetonide-21-valerate in a pharmaceutically acceptable carrier.

7 Claims, No Drawings

METHOD OF USING STEROID ACETONIDES

DESCRIPTION OF THE INVENTION

It is well known that steroids can be used topically and their use in this manner has met with varying degrees of success. The need has existed for a more potent topically useful steroid. We have now found that triamcinolone acetonide-21-valerate as the active component in a topical composition is a highly effective anti-inflammatory agent. This compound is more effective than many used in the past including triamcinolone acetonide as a topical anti-inflammatory agent by the vasoconstriction assay.

The active component of the present composition, triamcinolone acetonide-21-valerate, may be prepared by adding n-valeryl chloride to a cooled, stirred solution of triamcinolone acetonide. The mixture is subsequently heated to refluxing temperature and allowed to cool to room temperature. The mixture is diluted with ice water and extracted with a solvent such as chloroform. The chloroform extract is treated with water, dilute hydrochloric acid, dilute sodium bicarbonate and finally saturated saline. The chloroform extract is evaporated under reduced pressure. The product is slurried with acetone/n-hexane (1:19). Filtration gives the product $9\alpha$-fluoro-$11\beta$,21-dihydroxy-$16\alpha$,$17\alpha$-(isopropylidenedioxy)-1,4-pregnadiene-3,20-dione 21-valerate, herein described as triamcinolone acetonide-21-valerate.

This steroid product may be incorporated into a variety of conventional pharmaceutical formulations providing topical preparations at concentrations of, for example, 0.01 to 0.50 percent, topical ointments at similar concentrations or in lotions, etc.

The compositions containing the active component of this invention may be any of the standard pharmaceutical topical preparations: solutions, suspensions, lotions, ointments, creams, unguents, sprays, powders, foams, etc. Excipients used in such preparations may include buffers such as phosphate, citrate, or tartrate buffers, surfactants such as polyoxyethylene (20) sorbitan monooleate (polysorbate 80) which is a complex mixture of polyoxyethylene ethers of mixed partial oleic esters of sorbitol anhydrides and oxylated tertiary octylphenol formaldehyde polymer, which is a surface tension reducing agent. Preservatives such as methyl and propyl parabens, which are the methyl and propyl esters of p-hydroxybenzoic acid, potassium sorbate, benzyl alcohol and the like can be used. Oils, waxes, fats, etc. are useful as emollients and ointment or emulsion bases such as petrolatum, wool fat (anhydrous lanolin), squalane, spermaceti, and the like can also be useful. Stabilizers such as talc, clays, vegetable colloids, carboxymethylcellulose, carboxypolymethylene, and the like; and perfumes or fragrances such as lavender, lemon, gardenia, etc. may be found useful. Such preparations may be packaged in pressure containers, and adding to appropriate forms a propellant such as trichloro fluoromethane, dichlorodifluoromethane, or 1,-2-dichloro-1,1,2,2-tetrafluoroethane which are commonly used.

Triamcinolone acetonide-21-valerate was tested in comparison with a variety of other steroids having known topical anti-inflammatory activity according to a method measuring vasoconstriction. This assay is described in the following publications: "Topical Activities of Betamethasone Esters in Man", A. W. McKenzie and R. M. Atkinson, Archives of Dermatology 89, 741–746 (1964). "Method for Comparing Percutaneous Absorption of Steroids", A. W. McKenzie and R. B. Stoughton, Archives of Dermatology 86, 608-610 (1962). "Percutaneous Absorption of Steroids", A. W. McKenzie, Archives of Dermatology 86, 611–614 (1962).

The various compounds are prepared for testing by serial dilutions in 95 percent alcohol to give concentrations of 1:10,000 to 1:6,250,000 at 5 levels. Two hundredths of a milliliter of each dilution is applied to the volar surface of the forearm of 10 normal human subjects. Triamcinolone acetonide at the same dilutions is applied to the other forearm. The areas of application are occluded for 16–20 hours and then observed to determine whether vasoconstriction is present or absent, the intensity of the vasoconstriction is not graded.

The results appear in the Table hereinafter, wherein the relative potencies of steroids vs. triamcinolone acetonide are given.

TABLE

Relative Potencies of Steroids (vs. Triamcinolone Acetonide) in the Human Vasoconstriction Assay

| Compound | Relative Potency (triamcinolone acetonide= 1.0) |
|---|---|
| Triamcinolone acetonide-21-valerate | 2.6 |
| Triamcinolone-21-valerate | 0.105 |
| Triamcinolone-16-acetate-21-valerate | 0.01 |
| Triamcinolone-16-valerate | 0.021 |
| Triamcinolone-16-acetate-17-21-methylorthovalerate | 0.040 |
| Triamcinolone-16,17,21-orthovalerate | 0.089 |
| 1,2-Dihydrotriamcinolone acetonide-21-valerate | 1.6 |
| Triamcinolone acetonide-21-tert. butylacetate | 0.021 |
| Triamcinolone acetonide-21-tetrahydropyranyl ether | 0.72 |
| Triamcinolone-16,71-cyclic carbonate-21-ethylcarbonate | 0.03 |

These results show that when compared to triamcinolone acetonide, triamcinolone acetonide-21-valerate is 2.6 times more potent in the assay. All other steroids tested were significantly lower in activity and only one other showed activity greater than triamcinolone acetonide.

SPECIFIC DISCLOSURE

The following examples describe the preparation of triamcinolone acetonide-21-valerate and its use in various topical preparations. Parts are by weight unless otherwise indicated.

EXAMPLE 1

Preparation of $9\alpha$-Fluoro-$11\beta$,21-dihydroxy-$16\alpha$,$17\alpha$-(isopropyl-idenedioxy)-1,4-pregnadiene-3,21-dione 21-valerate To a stirred solution of 3.0 gm. (6.9 millimoles) of triamcinolone acetonide in 50 ml. of pyridine, cooled in an ice/water bath, is added dropwise 1.68 ml. (14.1 millimoles) of n-valeryl chloride. The cooling bath is removed when addition is complete. The reaction mixture is refluxed for 1 hour, allowed to cool to room temperature and stored at room temperature overnight. The reaction mixture is poured into about 1.5 liters of ice and water with stirring. The aqueous solution is extracted with four 100 ml. portions of chloroform.

The chloroform extract is treated with water, dilute hydrochloric acid, dilute sodium bicarbonate and finally, with saturated saline solution. The chloroform extract is dried over anhydrous magnesium sulfate overnight and then evaporated under reduced pressure to a solid. The solid is slurried with acetone/n-hexane (1:19), 25 ml. The product is removed by filtration, giving 3.03 gm. (84.5 percent yield) of colorless product. Evaporation of the filtrate afforded a second crop, 0.33 gm. (total yield 93.5 percent). Crystallization from acetone/n-hexane gives a sample exhibiting the following properties: Melting point 262.5°–263.5°C. corrected Kofler hot stage; DTA, single endotherm 264°C. corrected. I. R. $v_{max}^{KB}r$ 3390, 1754, 1733, 1672, 1626, 1166, and 1058 cm$^{-1}$; $[\alpha]_D^{25}$ +93° (C = .408, CHCl$_3$ 1 dm); $\lambda_{max}^{CH3OH}$ 238m$\mu$ ($\epsilon$16,600). Purity by partition column chromatography 99 percent. Analysis calculated for $C_{29}H_{39}O_7F$: C, 67.16; H, 7.58; F. 3.66. Found: C, 67.15; H, 7.75; F, 3.82.

EXAMPLE 2

Topical Cream Formulations Containing Variable Percentages of Triamcinolone acetonide-21-valerate

| Ingredient | Percent Range(w/w) |
|---|---|
| Triamcinolone acetonide-21-valerate | 0.01–0.5 |
| Glyceryl monostearate NF | 1–5 |
| Squalane* | 1–5 |
| Polysorbate 60** | 1–5 |
| Polysorbate 80 U.S.P.** | 1–5 |
| Spermaceti | 5–20 |
| Stearyl alcohol U.S.P. | 5–20 |
| Sorbitol solution U.S.P. | 1–10 |
| Preservatives | 3–5 |
| Distilled water | q.s. ad 100 |

*Squalane = 2,6,10,15,19,23-Hexamethyltetracosane
**Polysorbate = Polyoxyethylene sorbitan monooleate The ingredients are mixed in a conventional manner for preparing a pharmaceutical topical cream providing a white cream which may contain for example, depending upon selected percentage of ingredients, such steroid percentages as 0.01, 0.025, 0.1 or 0.5%.

EXAMPLE 3

Topical Ointment Formulations Containing Variable Percentages of Triamcinolone acetonide-21-valerate

| Ingredient | Percent Range (w/w) |
|---|---|
| Triamcinolone acetonide-21-valerate | 0.01–0.5 |
| White petrolatum U.S.P. | 100 |

The ingredients are blended in a conventional manner, providing a colorless topical ointment, which may provide for example, such steroid percentages as 0.01, 0.025, 0.10 or 0.50 percent.

If desired, an antibacterial component such as neomycin may be added to the formulation in amounts ranging from 0.1 percent to 3% (w/w), as the sulfate in a micronized form.

EXAMPLE 4

Topical Foam Formulation Containing Triamcinolone acetonide-21 valerate

| Ingredient | Weight Range (mg./Container) |
|---|---|
| Triamcinolone acetonide-21-valerate | 0.5–50 |
| Arlacel 60* | 20–50 |
| Myrj 59** | 300–500 |
| Glyceryl monostearate | 100–300 |
| Cetyl alcohol | 70–100 |
| Sorbitol 70% | 300–400 |
| Propylparaben | 3–5 |
| Methylparaben | 10–15 |
| Veegum Neutral | 15–20 |
| Distilled water | 6–10 (gm/Container) |
| Freon 12/114 (40/60)*** | 1.3–2.0 (gm/Container) |

*Arlacel=Sorbitan monostearate
**Myrj= Polyoxyethylene derivative of fat forming fatty acids
***Dichlorodifluoromethane/1,2-dichloro-1,1,2,2-tetrafluoroethane Ingredients are blended in a conventional manner, filled in containers and then pressurized with Freon.

EXAMPLE 5

Opthalmic Ointment Containing Variable Percentages of Triamcinolone acetonide-21-valerate

| Ingredient | Percent Range (w/w) |
|---|---|
| Triamcinolone acetonide-21-valerate | 0.01–0.50 |
| Mineral oil, Light N.F. | 1–5 |
| White petrolatum U.S.P. | q.s. ad 100 |

Ingredients are blended in a conventional manner providing an off-white opthalmic or otic preparation. Neomycin may be added as the micronized sulfate salt if an antibacterial ingredient is desired.

EXAMPLE 6

Topical Lotion Formulation Containing Variable Percentages of Triamcinolone acetonide-21-valerate

| Ingredient | Percent Range (w/w) |
|---|---|
| Triamcinolone acetonide-21-valerate | 0.01–0.5 |
| Polawax PD 34** | 3–5 |
| Volpo 20* | 0.5–2 |
| Oleyl alcohol | 1–5 |
| Methylparaben | 0.12–0.2 |
| Propylparaben | 0.02–0.06 |
| Squalane | 1–5 |
| Potassium Sorbate | 0.05–0.25 |
| Sorbitol 70% soln. | 5–10 |
| Distilled water | q.s. ad 100 |

*Volpo 20 = Polyoxyethylene ether of oleyl alcohol
**Polawax = Higher fatty alcohols and ethylene oxide reaction products The ingredients are blended in a conventional manner to provide an opaque creamy lotion.

EXAMPLE 7

Topical Ointment Formulation

| Ingredient | Percent Range (w/w) |
|---|---|
| Triamcinolone acetonide-21-valerate | 0.01–0.5 |
| Polyethylene glycol 400 U.S.P. | 5–20% |
| White Petrolatum U.S.P. | q.s. ad 100% |

The ingredients are blended providing a colorless topical ointment.

If desired, an antibacterial component such as neomycin may be added to the formulation in amounts ranging from 0.1% to 3% (w/w), as the sulfate in the micronized form.

We claim:

1. A method of meliorating inflammation in a mammal which comprises topically administering to said mammal an antiinflammatory amount of 9$\alpha$-fluoro-11$\beta$,21-dihydroxy-16$\alpha$,17$\alpha$-(isopropylidenedioxy)-1,4-pregnadiene-3,20-dione 21-valerate in association with a pharmaceutically acceptable carrier.

2. A method in accordance with claim 1, wherein the anti-inflammatory agent is incorporated in a topical cream.

3. A method in accordance with claim 1, wherein the anti-inflammatory agent is incorporated in a topical ointment.

4. A method in accordance with claim 1, wherein the anti-inflammatory agent is incorporated in a topical foam.

5. A method in accordance with claim 1, wherein the anti-inflammatory agent is incorporated in an opthalmic ointment.

6. A method in accordance with claim 1, wherein the anti-inflammatory agent is incorporated in a topical lotion.

7. A method of treating inflammation in a mammal comprising administering topically to said mammal an effective amount of the steroid 9α-fluoro-11β,21-dihydroxy-16α,17α-(iso-propylidenedioxy)-1,4-pregnadiene-3,20-dione 21-valerate in association with a pharmaceutically acceptable carrier in which the steroid is present in from about 0.01 to about 0.50 percent.

* * * * *